US008667112B2

(12) United States Patent
Roth et al.

(10) Patent No.: US 8,667,112 B2
(45) Date of Patent: Mar. 4, 2014

(54) SELECTIVE INTERACTION BETWEEN NETWORKED SMART DEVICES

(75) Inventors: Erik Roth, Shanghai (CN); Jinyung Park, Seoul (KR); Jaehwa Lee, Seoul (KR); Wookjin Chung, Seoul (KR); Stanley Kim, Seoul (KR); Soyoung Han, Seoul (KR); Heeyoung Hwang, Seoul (KR); Jiyeong Ku, Seoul (KR)

(73) Assignee: LG Electronics Inc., Seoul (KR)

( * ) Notice: Subject to any disclaimer, the term of this patent is extended or adjusted under 35 U.S.C. 154(b) by 270 days.

(21) Appl. No.: 12/995,585

(22) PCT Filed: Sep. 3, 2010

(86) PCT No.: PCT/KR2010/006012
§ 371 (c)(1),
(2), (4) Date: Dec. 1, 2010

(87) PCT Pub. No.: WO2012/011630
PCT Pub. Date: Jan. 26, 2012

(65) Prior Publication Data
US 2012/0023212 A1    Jan. 26, 2012

Related U.S. Application Data

(60) Provisional application No. 61/365,790, filed on Jul. 20, 2010.

(51) Int. Cl.
*G06F 15/173* (2006.01)
(52) U.S. Cl.
USPC .......................................... 709/223; 709/206
(58) Field of Classification Search
USPC ....................................................... 709/223
See application file for complete search history.

(56) References Cited

U.S. PATENT DOCUMENTS

| 6,725,303 | B1 | 4/2004 | Hoguta et al. |
| 6,771,290 | B1 | 8/2004 | Hoyle |
| 6,983,244 | B2 | 1/2006 | Junqua et al. |
| 7,636,365 | B2 | 12/2009 | Chang et al. |
| 7,734,148 | B2 | 6/2010 | Lee |
| 7,996,412 | B2 | 8/2011 | Bae et al. |

(Continued)

FOREIGN PATENT DOCUMENTS

| EP | 1835384 A2 | 9/2007 |
| JP | 2004-38283 A | 2/2004 |

(Continued)

*Primary Examiner* — Wing F Chan
*Assistant Examiner* — Andrew Woo
(74) *Attorney, Agent, or Firm* — Birch, Stewart, Kolasch & Birch, LLP

(57) ABSTRACT

Selective interaction between networked smart devices is disclosed. One embodiment of the present disclosure pertains to an apparatus for interacting with associated smart appliances via a network, where the apparatus comprises a memory; and a processor. The processor is configured to identify one or more associated smart appliances upon activation of a smart device in a network, where the smart device and the associated smart appliances are configured to communicate with each other for notification or for executing one or more commands. The processor is also configured to determine a mode of the smart device upon receiving data from the associated smart appliances, where the mode of the smart device is set through configuring a user experience environment of the smart device. The processor is further configured to selectively process the data from the associated smart appliances based on the mode of the smart device.

14 Claims, 7 Drawing Sheets

(56) References Cited

U.S. PATENT DOCUMENTS

| | | |
|---|---|---|
| 8,131,763 B2 | 3/2012 | Tuscano et al. |
| 2003/0236770 A1 | 12/2003 | Kurapati et al. |
| 2004/0172588 A1 | 9/2004 | Mattaway |
| 2005/0030708 A1 | 2/2005 | Kawasaki et al. |
| 2005/0091595 A1 | 4/2005 | Shappell et al. |
| 2006/0117001 A1* | 6/2006 | Jung et al. ............ 707/4 |
| 2006/0271618 A1 | 11/2006 | Kokubo et al. |
| 2007/0005707 A1 | 1/2007 | Teodosiu et al. |
| 2007/0050778 A1 | 3/2007 | Lee et al. |
| 2007/0156664 A1 | 7/2007 | Norton et al. |
| 2007/0294357 A1 | 12/2007 | Antoine |
| 2008/0082936 A1 | 4/2008 | Helvick |
| 2008/0310510 A1 | 12/2008 | Hiwasa et al. |
| 2009/0023395 A1* | 1/2009 | Chang et al. ............ 455/74.1 |
| 2009/0049380 A1 | 2/2009 | Rehling et al. |
| 2009/0094531 A1 | 4/2009 | Danieli et al. |
| 2009/0157513 A1 | 6/2009 | Bonev et al. |
| 2009/0158170 A1 | 6/2009 | Narayanan et al. |
| 2009/0249359 A1 | 10/2009 | Caunter et al. |
| 2009/0299960 A1 | 12/2009 | Lineberger |
| 2009/0307168 A1 | 12/2009 | Bockius et al. |
| 2009/0313004 A1 | 12/2009 | Levi et al. |
| 2010/0030578 A1 | 2/2010 | Siddique et al. |
| 2010/0043061 A1 | 2/2010 | Martin et al. |
| 2010/0066698 A1 | 3/2010 | Seo |
| 2010/0088634 A1 | 4/2010 | Tsuruta et al. |
| 2010/0122184 A1 | 5/2010 | Vonog et al. |
| 2010/0138767 A1 | 6/2010 | Wang et al. |
| 2010/0169823 A1 | 7/2010 | Audet |
| 2010/0174993 A1 | 7/2010 | Pennington et al. |
| 2010/0241980 A1 | 9/2010 | Sosnosky et al. |
| 2010/0241989 A1 | 9/2010 | Wen |
| 2010/0295992 A1 | 11/2010 | Lee et al. |
| 2010/0299628 A1 | 11/2010 | Har'el et al. |
| 2011/0066957 A1 | 3/2011 | Prats et al. |
| 2011/0113385 A1 | 5/2011 | Sayers et al. |
| 2012/0092253 A1 | 4/2012 | Irani et al. |

FOREIGN PATENT DOCUMENTS

| | | | |
|---|---|---|---|
| JP | 2004-62369 A | | 2/2004 |
| JP | 2005-285274 A | | 10/2005 |
| JP | 2007-42173 A | | 2/2007 |
| JP | 2007-272625 A | | 10/2007 |
| JP | 4564488 B2 | | 10/2010 |
| KE | 10-2008-0023575 A | | 3/2008 |
| KR | 10-2005-0055101 A | | 6/2005 |
| KR | 10-2005-0099741 A | | 10/2005 |
| KR | 10-2009-0062371 A | | 6/2009 |
| KR | 10-2009-0113508 A | | 11/2009 |
| KR | 10-2010-002758 A | | 1/2010 |
| WO | WO 2008/048008 A1 | | 4/2008 |

\* cited by examiner

SELECTIVE INTERACTION BETWEEN NETWORKED SMART DEVICES

CROSS REFERENCE TO RELATED APPLICATIONS

This application is the National Phase of PCT/KR2010/006012 filed on Sep. 3, 2010 which claims priority under 35 U.S.C. 119(e) to U.S. Provisional Application No. 61/365,790 filed on Jul. 20, 2010, all of which are hereby expressly incorporated by reference into the present application.

TECHNICAL FIELD

Embodiments of the present disclosure relate to the field of electronics. More particularly, embodiments of the present disclosure relate to interaction of smart devices in a network.

BACKGROUND ART

Smart devices are devices that are digital, active, and computer networked. The smart devices are also user configurable and can operate to some extent autonomously. Appliances are devices that are task specific and under control of some embedded system or application specific operating system. One distinctive difference between the smart devices and the appliances may lie in the ability of the smart devices in supporting multiple tasks, whereas the appliances may be configured to perform a single task.

Some of the examples of the smart devices may include a personal computer (PC), a tablet PC, a smart TV, a mobile phone, a laptop computer, etc. Some of the examples of the appliances may include a home appliance, which further include major appliances (e.g., an air-conditioner, a dishwasher, a clothes dryer, a freezer, a kitchen stove, a water heater, a washing machine, a trash compactor, a microwave oven, etc.) as well as small appliances (e.g., a CD/DVD player, camcorder, a camera, a clock, a telephone, etc.). Recently, the smart devices and the appliances are being connected through a network as an effort for automating home or office.

DISCLOSURE OF INVENTION

Solution to Problem

One embodiment of the present disclosure pertains to a method of a smart device interacting with associated smart devices via a network. The method comprises identifying one or more associated smart devices upon activation of a smart device in a network, where the smart device and the associated smart devices are configured to communicate with each other for notification or for executing one or more commands. The method also comprises determining a mode of the smart device upon receiving data from the associated smart devices, where the mode of the smart device is set through configuring a user experience environment of the smart device. The method further comprises selectively processing the data from the associated smart devices based on the mode of the smart device.

BRIEF DESCRIPTION OF DRAWINGS

Example embodiments are illustrated by way of example and not limitation in the figures of the accompanying drawings, in which like references indicate similar elements and in which.

Figure 1:
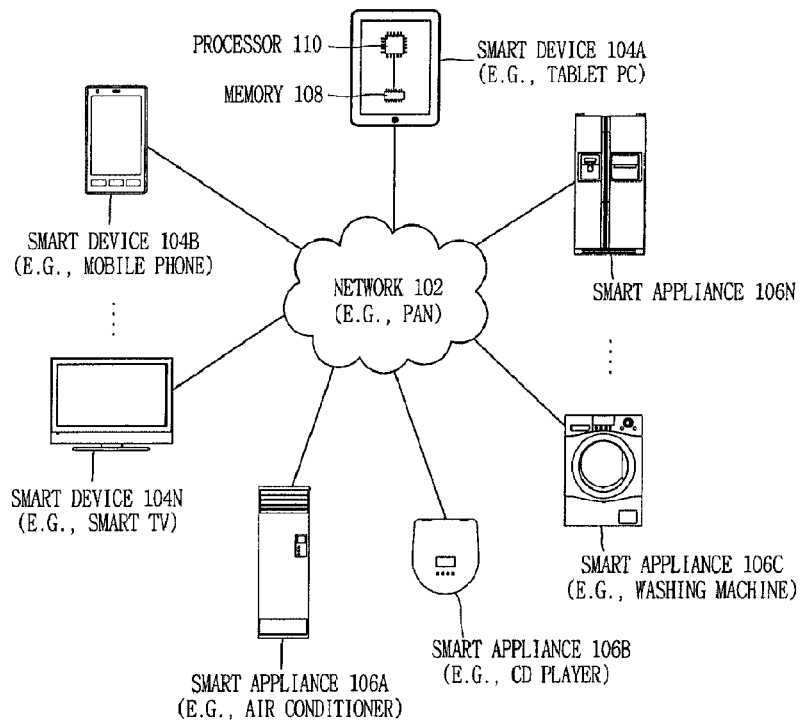
FIG. 1 illustrates an exemplary network view of a smart device selectively interacting with associated smart devices or smart appliances, according to one embodiment of the present disclosure.

Other features of the present embodiments will be apparent from the accompanying drawings and from the detailed description that follows.

MODE FOR THE INVENTION

A method, device and/or system are disclosed that selectively interact data based on the mode of the device. According to embodiments of this disclosure, a number of smart devices and/or smart appliances may be connected through a network (e.g., a home network). If a user is currently using a particular device, the user may want to be notified of any developments with the remaining smart devices or smart appliances that the user cannot attend to. However, the user may choose to block unnecessary messages of low importance or priority to concentrate on or enjoy the user's current task.

As a solution, the user may selectively process data (e.g., notification data, command data, etc.) from the associated device(s) with respect to the current mode of the smart device currently operated by the user. For example, if the user is using a tablet PC, the user may configure the mode of the tablet PC to set up the communication mode of the tablet PC, first. For example, if the user is currently free to receive any message or notification, then the user may configure the threshold level of the data received and to be processed by the tablet PC to be the lowest. Accordingly, any message or notification from the associated device(s) may be processed and displayed on a display unit of the tablet PC. Alternatively, if the user is fully occupied by the current task on the tablet PC, the user may set the threshold level of the received data to be processed by the tablet PC to be the highest or choose to block any message addressed to the tablet PC.

In another embodiment, the user may configure the user experience (UX) environment (e.g., a home screen) of the smart device currently operated by the user such that the mode of the smart device automatically changes on a temporal basis. For example, the mode of the smart device (e.g., a mobile phone) may be set to put the mode of the mobile phone in an organize mode (e.g., which put forwards apps such as Outlook® calendar, etc. on the home screen of the smart device) between 6 am and 9 am, in a work mode (e.g., which put forwards apps such as MS Word®, Power Point®, etc.) between 9 am and 6 pm, in a connect mode (e.g., which put forwards widgets such as Hotmail®, Gmail®, Gtalk®, etc.), and a relax mode between 9 pm and 6 am (e.g., which put forwards apps and/or widgets such as YouTube®, games, etc.). Once the mode of the mobile phone is set on the temporal basis, then the mode of the mobile phone may be determined by referring to the time upon the receipt of data from an associated smart device. Then, the data may be processed based on the mode of the mobile phone. As discussed above, if the priority of the data from the associated device is lower than the threshold level of data to be processed by the mobile phone under the current mode, then the data may be ignored by the mobile phone.

As described above, the selective interaction of the smart devices sharing a network may enable the user of the smart devices to automatically filter the amount of data that need to be processed by the user. More particularly, by selectively screening messages or notifications from associated devices with respect to the current mode of the smart device, the user may be able to enjoy more of the UX environment afforded by the smart device, while freeing the user from attending to needless tasks.

Reference will now be made in detail to the embodiments of the disclosure, examples of which are illustrated in the accompanying drawings. While the disclosure will be described in conjunction with the embodiments, it will be understood that they are not intended to limit the disclosure to these embodiments. On the contrary, the disclosure is intended to cover alternatives, modifications and equivalents, which may be included within the spirit and scope of the disclosure. Furthermore, in the detailed description, numerous specific details are set forth in order to provide a thorough understanding of the present disclosure. However, it will be obvious to one of ordinary skill in the art that the present disclosure may be practiced without these specific details. In other instances, well known methods, procedures, components, and circuits have not been described in detail as not to unnecessarily obscure aspects of the present disclosure. Further, throughout this document, the smart devices may be used to include any devices or appliances that can communicate with one or more other smart devices or appliances through a network.

FIG. 1 illustrates an exemplary network view of a smart device 104A selectively interacting with associated smart devices 104B-N and/or smart appliances 106A-N, according to one embodiment of the present disclosure. In FIG. 1, the smart device 104A is connected with the smart devices 104B-N and the smart appliances 106A-N through a network 102. In one embodiment, the network 102 is a short range network (e.g., a personal area network (PAN)). In an alternative embodiment, the network 102 may be any combination of the short range network, a local area network (LAN), a home area network, a campus network, a global area network, an enterprise private network, a virtual private network, an internetwork, an Internet, an intranet and extranet, an overlay network, etc.

As illustrated in FIG. 1, the smart device 104A is an apparatus or device (e.g., a smart device) which comprises a memory 108 and a processor 110 coupled to the memory 108. In one embodiment, the processor 110, when executed, is configured to identify the associated smart appliances 106A-N and/or the smart devices 104B-N upon activation of the smart device 104A in the network 102, where the smart device 104A and the associated smart appliances 106A-N and/or the smart devices 104B-N are configured to communicate with each other for notification or for executing one or more commands. For example, as the smart device 104A is turned on within the network 102 or enters the network 102, the smart device 104A may poll the associated smart devices 104B-N and/or the smart appliances 106A-N periodically or continuously to track or monitor the existing or currently active associated smart devices 104B-N and/or appliances 106A-N.

In one example implementation, the smart devices 104A-N include a personal computer (PC), a tablet PC, a smart TV, a mobile phone, a laptop computer, etc. Further, the smart appliances 106A-N include a home appliance, such as an air-conditioner, a dishwasher, a clothes dryer, a freezer, a kitchen stove, a water heater, a washing machine, a trash compactor, a microwave oven, a CD/DVD player, camcorder, a camera, a clock, a telephone, etc.

Figure 4:
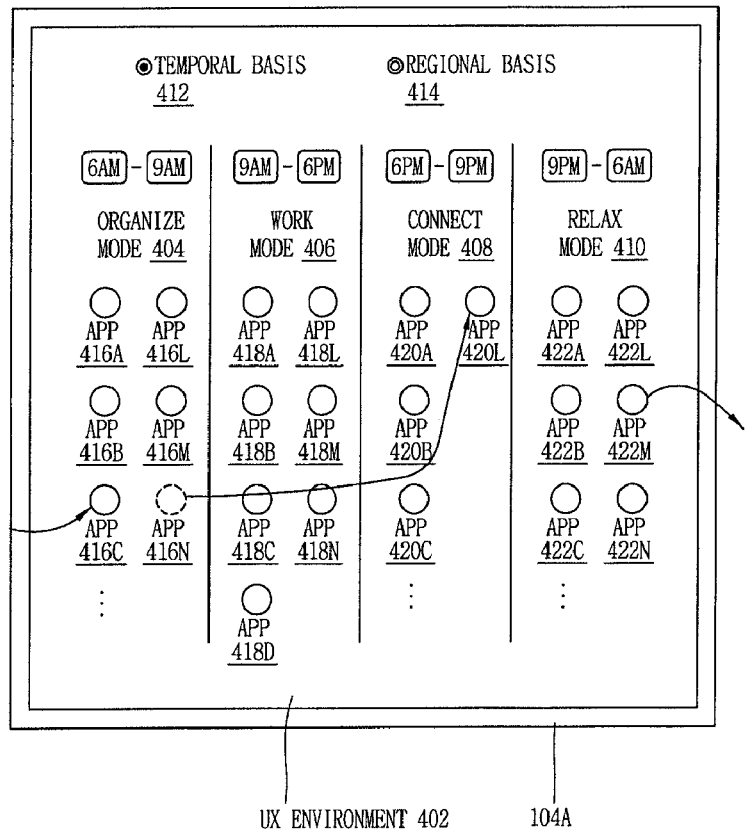
FIG. 4 illustrates an exemplary process for configuring a mode of the smart device in FIG. 1, according to one embodiment of the present disclosure.

In addition, the processor 110 is configured to determine a mode of the smart device 104A upon receiving data from one or more of the associated smart appliances 106A-N and/or the smart devices 104B-N, where the mode of the smart device 104A is set through configuring a user experience (UX) environment of the smart device 104A, as will be illustrated in details in FIG. 4. The data from the associated smart appliances 106A-N and/or the smart devices 104B-N may be notification data for notifying the smart device 104A or command data for causing the smart device 104A to execute one or more commands. For example, a smart TV, which is currently operated by the user, may be notified of an alert event (e.g., an incoming call to a mobile phone associated with the smart TV) or instructed to record a particular TV program. Further, the processor 110 is configured to selectively process the data from the associated smart appliances 106A-N and/or the smart devices 104B-N based on the mode of the smart device 104A.

Figure 2:
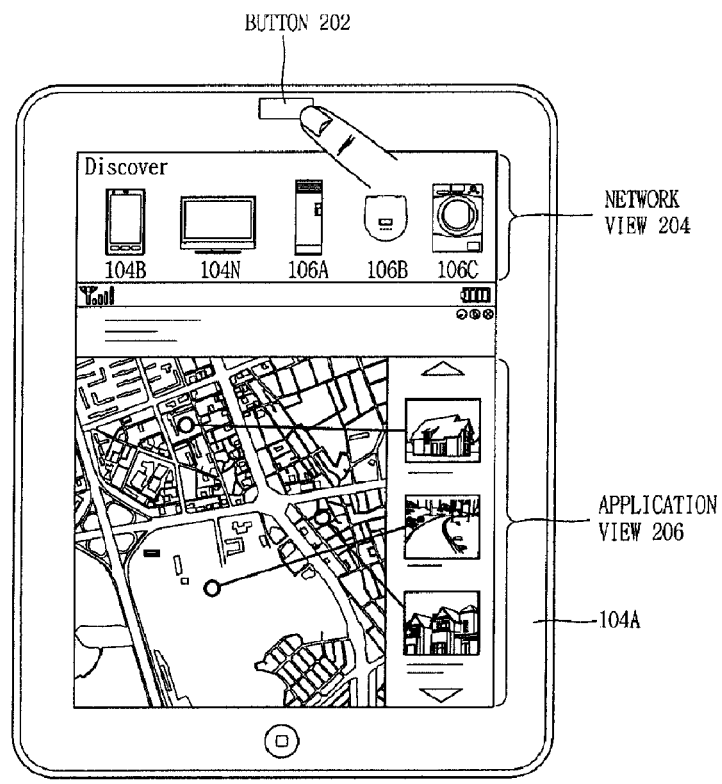
FIG. 2 illustrates an exemplary view of the smart device in FIG. 1, according to one embodiment of the present disclosure.

FIG. 2 illustrates an exemplary view of the smart device 104A (e.g., a tablet PC) in FIG. 1, according to one embodiment of the present disclosure. In FIG. 2, a display unit of the smart device 104A displays a network view 204 on the top half of the smart device 104A and an application view 206 on the bottom half. In one embodiment, the network view 204 is generated upon activation of the smart device 104A in the network 102. In FIG. 2, as the user presses a button 202 at the top of the smart device 104A, representative images (e.g., icons, avatars, etc.) of the associated smart devices 104B-N and/or the smart appliances 106A-N are displayed on a display unit of the smart device 104A.

For example, the network view 204 is displayed on the display unit of the smart device 104A to inform the user that the smart device 104B (e.g., a mobile phone), the smart device 104N (e.g., a smart TV), the smart appliance 106A (e.g., an air conditioner), the smart appliance 106B (e.g., a CD player), and the smart appliance 106C (e.g., a washing machine) are currently connected to the smart device 104A through the network 102. It is appreciated that the button 202 may be realized through a soft button on a touch panel or through voice recognition technology instead. The application view 206 may process one or more applications (e.g., web application(s) and/or application software implemented on the smart device 104A), such as Face Book®.

Figure 3:
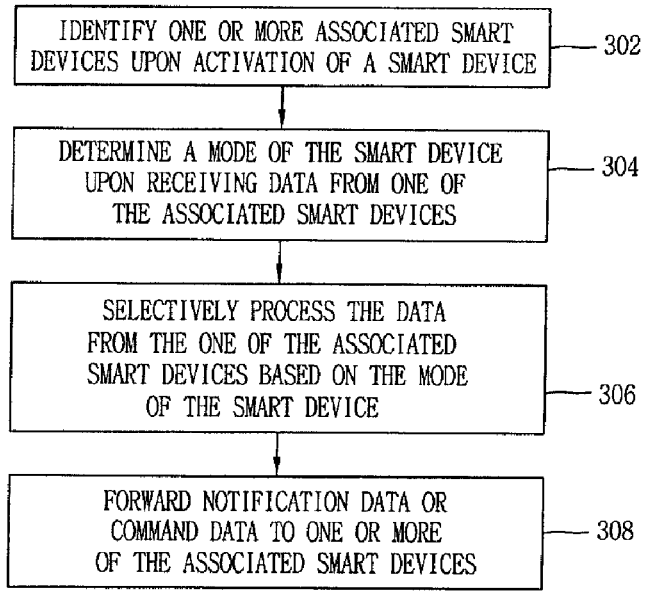
FIG. 3 illustrates a process flow chart of an exemplary method of a smart device selectively interacting with one or more associated smart devices, according to one embodiment of the present disclosure.

FIG. 3 illustrates a process flow chart of an exemplary method of a smart device selectively interacting with one or more associated smart devices, according to one embodiment of the present disclosure. In keeping with the previous examples, particular components described with respect to FIG. 1 are referenced as performing the process in FIG. 3. It should be noted that the components that are referred to as performing the process are for illustrative purposes only. In some implementations, other components, or a different combination of components within a system, may instead perform the process in FIG. 3.

In operation 302, one or more of the associated smart devices 104B-N and 106A-N are identified upon activation of the smart device 104A in the network 102, where the smart device 104A and the associated smart devices 104B-N and 106A-N are configured to communicate with each other for notification or for executing one or more commands. In operation 304, a mode of the smart device 104A is determined upon receiving data from one of the associated smart devices 104B-N and 106A-N, where the mode of the smart device 104A is set through configuring a UX environment of the smart device 104A. For example, the data from the associated smart devices 104B-N and 106A-N is notification data for notifying the smart device 104A or command data for causing the smart device 104A execute one or more commands.

Figure 5:
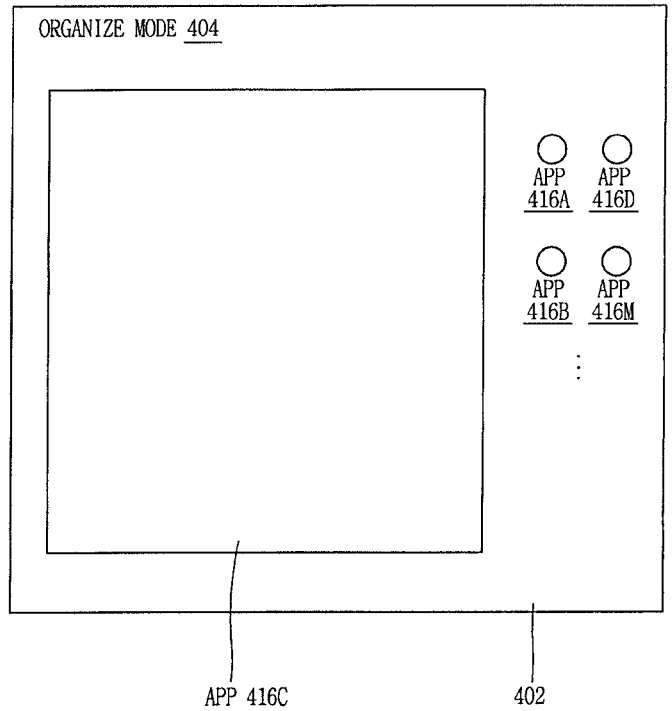
FIGS. 5-8 illustrate exemplary processes of the smart device in FIG. 1 selectively interacting with an associated smart device, according to one embodiment of the present disclosure.
Figure 6:
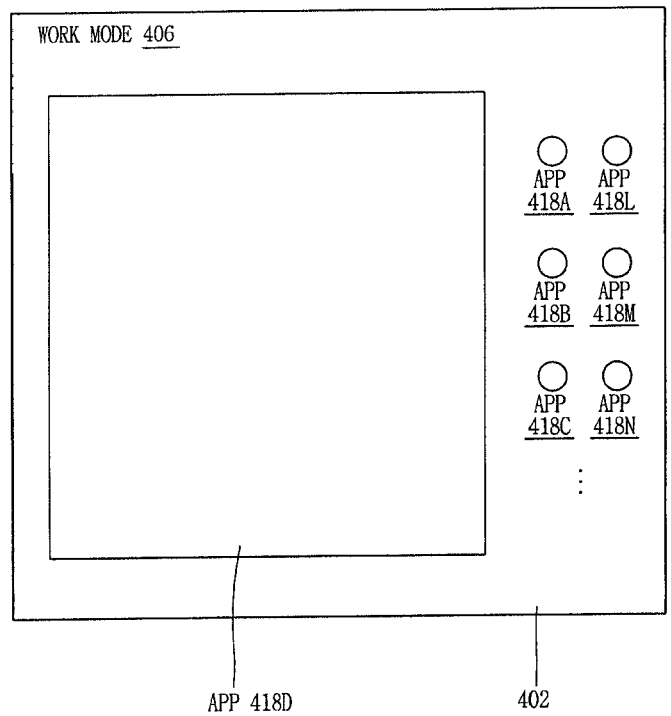

In operation 306, the data from one of the associated smart devices 104B-N and 106A-N is selectively processed based on the mode of the smart device 104A, as will be illustrated in detail in FIGS. 4-6. In operation 308, data, such as notification data or command data, from the smart device 104A is forwarded to the associated devices 104B-N and 106A-N. In an alternative embodiment, operation 308 may be performed directly subsequent to operation 302.

It is appreciated that the methods disclosed in FIG. 3 may be implemented in a form of a machine-readable medium embodying a set of instructions that, when executed by a machine, cause the machine to perform any of the operations disclosed herein.

FIG. 4 illustrates an exemplary process for configuring a mode of the smart device in FIG. 1, according to one embodiment of the present disclosure. In FIG. 4, a mode of the smart device 104A is set through configuring a UX environment 402 of the smart device 104A. In one example implementation, the UX environment 402 is a home screen of the smart device 104A. In one embodiment, the mode of the UX environment 402 is configured by setting the mode of the smart device 104A on a temporal basis 412 or a regional basis 414. For example, as illustrated in FIG. 4, the mode of the UX environment 402 comprises an organize mode 404, a work mode 406, a connect mode 408, and a relax mode 410.

More particularly, as illustrated in FIG. 4, the mode of the smart device 104A is set according to the temporal basis 412, where the smart device 104A is set to be in the organize mode 404 between 6 am and 9 am, in the work mode 406 between 9 am and 6 pm, in the connect mode 408 between 6 pm and 9 pm, and in the relax mode 410 between 9 pm and 6 am. Further, using the configuration page of the UX environment 402, the modes may be modified by adding, deleting, moving, etc. one or more applications, contents (not shown), widgets (not shown), etc. In the example embodiment, initially, the organize mode 404 includes apps 416A, B and D-N, the work mode 406 includes apps 418A-N, the connect mode 408 includes apps 420A-K, and the relax mode 410 includes apps 422A-N. Once the mode of the smart device 104A is set according to the temporal basis 412, the step (e.g., step 304) of determining the mode of the smart device 104A in the method described in FIG. 3 may be performed by determining the current time recognized by the smart device 104A. For example, if the time maintained by the smart device 104A is 11:14 am, then the mode of the smart device 104A is determined to be in the work mode 406 according to the configuration illustrated in FIG. 4.

In an alternative embodiment, the mode of the smart device 104A is set based on the regional basis 414. Although it is not shown, the mode of the smart device 104A or the UX environment 402 may be set based on the global positioning system (GPS) information associated with the smart device 104A. For example, the mode of the smart device 104A may be configured to be in the organize mode 404 when the user is in route to the work from home, to be in the work mode 406 when the user is at work, to be in the connect mode 408 when the user is in route to home from work, and to be in the relax mode 410 when the user is at home.

In yet another alternative embodiment, the mode of the smart device 104A is set based on a primary task currently executed on the UX environment 402. That is, the mode of the smart device 104A may be set based on the user's choosing of a particular application as the primary task of the smart device 104A. For example, the mode of the smart device 104A may be put to the organize mode 404 if the user is currently executing a calendar program as the primary task, to the work mode 406 if the user is currently executing a word processing program as the primary task, to the connect mode 408 if the user is currently running an email program as the primary task, or to the relax mode 410 if the user is currently executing an online game program as the primary task.

In FIG. 4, a particular mode of the UX environment 402 may be modified by adding, deleting or moving one or more icons from a group of application associated with the mode of the UX environment 402. For example, the app 416C (e.g., short for application 416C) is added to the group of applications for the organize mode 404. The app 416N is moved from the organize mode 404 to become the app 420L in the connect mode 408. Further, the app 422M is deleted from the relax mode 410 of the UX environment 402. If the mode of the smart device 104A is set according to the regional basis 414, the step (e.g., step 304) of determining the mode of the smart device 104A in the method described in FIG. 3 may be performed by determining the current location recognized by the smart device 104A. For example, if the GPS information processed by the smart device 104A indicates the user to be at work, then the mode of the smart device 104A is determined to be in the work mode 406 according to the configuration illustrated in FIG. 4.

FIGS. 5-8 illustrate exemplary processes of the smart device in FIG. 1 selectively interacting with an associated smart device, according to one embodiment of the present disclosure. FIG. 5 illustrates the UX environment 402 (e.g., a home screen) of the smart device 104A executing the organize mode 404. In FIG. 5, the center of the home screen is occupied by the app 416C, which is the currently active application, and other applications (e.g., the apps 416A-B and apps 416D-N in FIG. 4) which correspond to the organize mode 404 are displayed and/or enabled on one side of the screen.

While the smart device 104A is in the organize mode 404, data from the associated devices 104B-N and/or the associated appliances 106A-N in FIG. 1 may be selectively processed based on the mode of the smart device 104A. In one embodiment, a message notifying a receipt of the data is displayed on a display unit of the smart device 104A when the mode of the smart device 104A is configured to process the data from the associated smart device 104B-N and/or the associated smart appliances 106A-N. In one exemplary implementation of the embodiment, the priority level of data from an associated smart device (e.g., the smart device 104B) is identified first. Then, a processing value is set to 'true' if the priority level of the data is equal to or higher than the threshold level of data to be processed by the smart device 104A in the organize mode 404. For example, if the priority level of the data being '1' is higher than the threshold level being '3,' then the processing value is set to 'true.' Accordingly, a message (e.g., an alert message) which notifies the receipt of the data from the associated smart device is displayed on a display unit of the smart device 104A.

However, in an alternative embodiment, a message notifying a receipt of the data is masked when the mode of the smart device 104A is configured to cease the processing of the data from the associated smart device 104B-N and/or the associated smart appliances 106A-N. In one exemplary implementation of the alternative embodiment, a processing value is set to 'false' if the priority level of the data is lower than the threshold level. Accordingly, the UX environment 402 may not display any message indicating arrival of the data from the associated smart device. This way, notification of events with minimal importance with respect to the current mode of the user device may be avoided.

FIG. 6 illustrates the UX environment 402 (e.g., a home screen) of the smart device 104A executing the work mode 406. In FIG. 6, the center of the home screen is occupied by the app 418D, which is the currently active application, and other applications (e.g., the apps 418A-C and apps 418E-N in FIG. 4) which correspond to the work mode 406 are displayed and/or enabled on one side of the screen.

While the smart device 104A is in the work mode 406, data from the associated devices 104B-N and the associated appliances 106A-N in FIG. 1 may be selectively processed based on the mode of the smart device 104A. In one exemplary implementation, a priority level of data from an associated smart device (e.g., the smart device 104B) or a smart appliance (e.g., the smart appliance 106C) is identified first. Then, a processing value for the data is set to 'true' if the priority level of the data from the associated smart device is equal to or higher than the threshold level of data to be processed by the smart device 104A in the work mode 408.

For example, the threshold level may be set to '1' for the work mode 406 of the smart device 104A, so that the data from any smart device or appliance may be processed to be displayed on the display unit of the smart device 104 only if the priority level of the data is equal to '1.' In this example, only the priority level of the data from the smart device 104B (e.g., the mobile phone) may be set to equal to '1' to allow its processing by the smart device 104A. Accordingly, only an alert message which notifies a receipt of the data from the smart device 104B is displayed on the display unit of the smart device 104A. However, data from the remaining smart devices or smart appliances may be ignored or queued for processing until the mode of the smart device 104A is changed to a lower priority.

Figure 7:
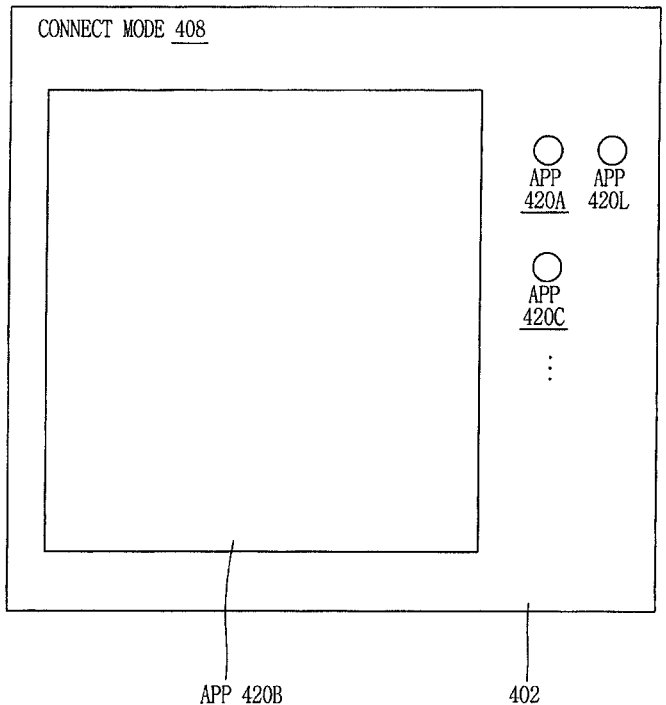

FIG. 7 illustrates the UX environment 402 (e.g., a home screen) of the smart device 104A executing the connect mode 408. In FIG. 7, the center of the home screen is occupied by the app 420B, which is the currently active application, and other applications (e.g., the apps 420A and 420C-L in FIG. 4) which correspond to the connect mode 408 are displayed and/or enabled on one side of the screen.

While the smart device 104A is in the connect mode 408, data from the associated devices 104B-N and the associated appliances 106A-N in FIG. 1 may be selectively processed based on the mode of the smart device 104A. In one exemplary implementation, the priority level of data from an associated smart device (e.g., the smart device 104B) or a smart appliance (e.g., the smart appliance 106C) is identified first. Then, the processing value for the data is set to 'true' if the priority level of the data from the smart device 104B (e.g., the priority level of '1') or smart appliance 106C (e.g., the priority level of '3') is equal to or higher than the threshold level of data to be processed by the mode of the smart device 104A. For example, the threshold level may be set to '2,' thus allowing the data from other device(s) with the priority level equal to or higher than '2' to be processed by the smart device 104A. Accordingly, a message which notifies a receipt of the data from the smart device 104B may be displayed on the display unit of the smart device 104A since the processing value is 'true.' However, the UX environment 402 may not display any message forwarded by the smart appliance 106C.

Figure 8:
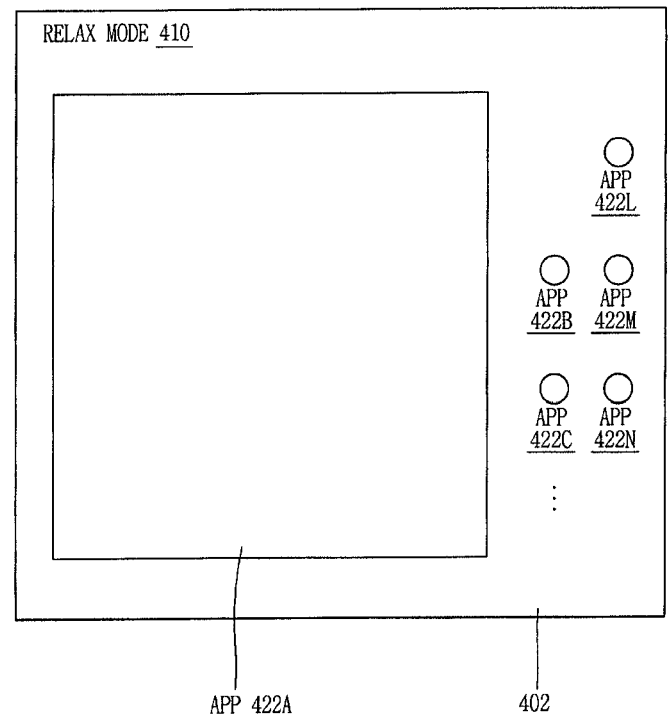

FIG. 8 illustrates the UX environment 402 (e.g., a home screen) of the smart device 104A executing the relax mode 410. In FIG. 8, the center of the home screen is occupied by the app 422A, which is the currently active application, and other applications (e.g., the apps 422B-N in FIG. 4) which correspond to the relax mode 410 are displayed and/or enabled on one side of the screen.

While the smart device 104A is in the relax mode 410, data from the associated devices 104B-N and the associated appliances 106A-N in FIG. 1 may be selectively processed based on the mode of the smart device 104A. In one exemplary implementation, the priority level of data from an associated smart device (e.g., the smart device 104B) or a smart appliance (e.g., the smart appliance 106C) is identified first. Then, the processing value for the data is set to 'true' if the priority level of the data from the associated smart device is equal to or higher than the threshold level of data to be processed by the mode of the smart device 104A. For example, the threshold level may be set to '4' or to the lowest priority for the smart device 104A in the relax mode 410, so that the data from any smart device or appliance may be processed to be displayed on the display unit of the smart device 104A. Accordingly, a message which notifies a receipt of the data from the smart device 104B as wells as the smart appliance 106C is displayed on the display unit of the smart device 104A.

Figure 9:
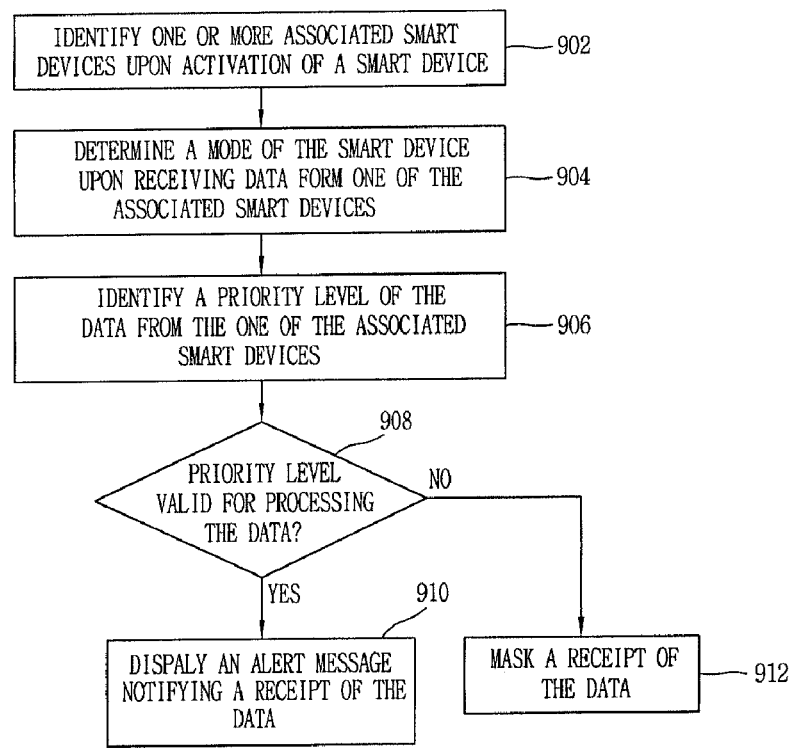
FIG. 9 illustrates a process flow chart of another exemplary method of a smart device selectively interacting with one or more associated smart devices, according to one embodiment of the present disclosure.

FIG. 9 illustrates a process flow chart of another exemplary method of the smart device in FIG. 1 selectively interacting with one or more associated smart devices, according to one embodiment of the present disclosure. In keeping with the previous examples, particular components described with respect to FIG. 1 are referenced as performing the process in FIG. 9. It should be noted that the components that are referred to as performing the process are for illustrative purposes only. In some implementations, other components, or a different combination of components within a system, may instead perform the process in FIG. 9.

In operation 902, one or more associated smart devices 104B-N and 106A-N are identified upon activation of the smart device 104A in the network 102, where the smart device 104A and the associated smart devices 104B-N and 106A-N are configured to communicate with each other for notification or for executing one or more commands. In operation 904, a mode of the smart device 104A is determined upon receiving data from one of the associated smart devices 104B-N and 106A-N, where the mode of the smart device 104A is set through configuring the UX environment 402 of the smart device 104A.

In operation 906, a priority level of the data from the one of the associated smart devices 104B-N and 106A-N is identified. In operation 908, it is determined whether the priority level of the data is valid for processing. That is, a processing value of the data is set to 'true' or 'valid' if the priority level of the data from the one of the associated smart devices 104B-N and 106A-N is equal to or higher than the threshold level of data to be processed by the mode of the smart device 104A. Otherwise, the processing value of the data is set to 'false' or 'invalid.' If the priority level of the data is valid for processing, in operation 910, a notification message or an alert message which notifies a receipt of the data is displayed on a display unit of the smart device 104A. However, if the priority level of the data is not valid for processing, in operation 912, the display unit of the smart device 104A won't notify the user of the arrival of the data from the associated smart device.

Figure 10:
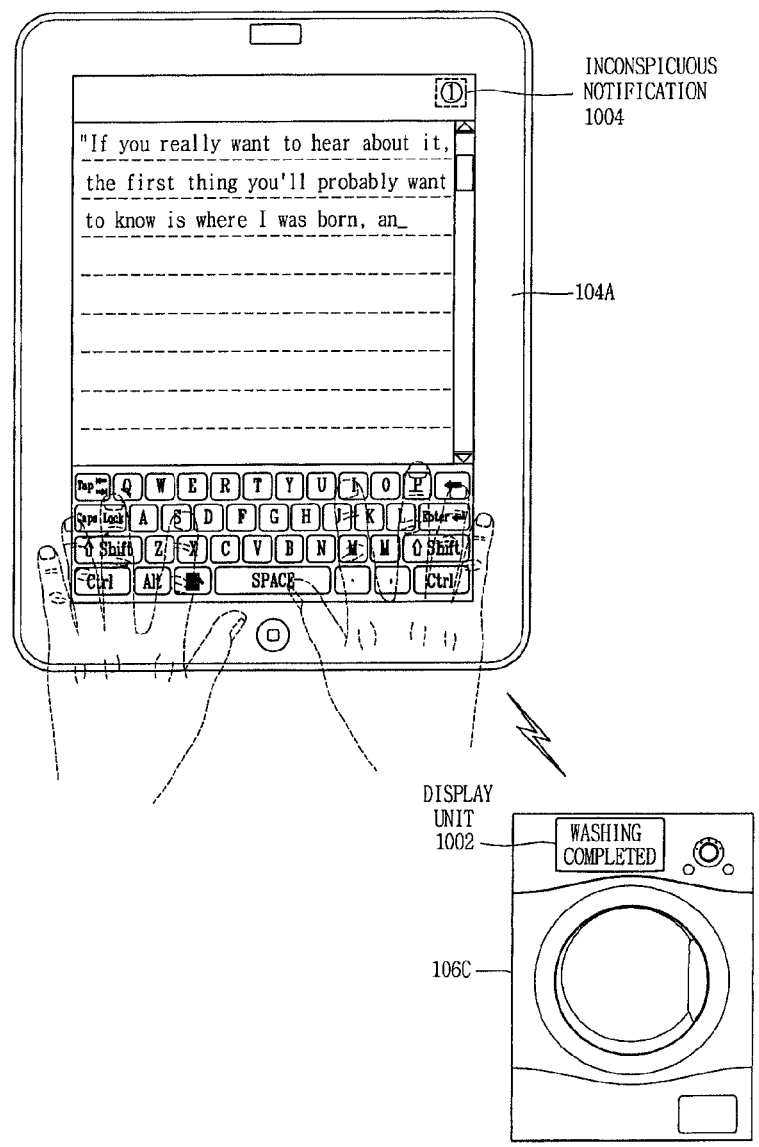
FIG. 10 illustrates an exemplary view of the smart device in FIG. 1 interacting with a smart appliance, according to one embodiment of the present disclosure.

FIG. 10 illustrates an exemplary view of the smart device 104A in FIG. 1 interacting with the smart appliance 106C, according to one embodiment of the present disclosure. In FIG. 10, the smart device 104A is in a work mode, where the user of the smart device 104A may not want to be interrupted by extracurricular activities (e.g., notification, alert, etc.) of any associated smart device(s) or appliance(s) connected via the network 102. For example, the smart device 104A may be set to be in the work mode when a primary task such as an MS Office® type of application is performed. In such an instance, when the smart appliance, such as the smart appliance 106C, forwards a certain notification, the smart device 104A may not display the notification at all or choose to display it inconspicuously, thus refraining from interruption of the ongoing task of the smart device 104A.

For example, in FIG. 10, the smart device 104A is connected to the smart appliance 106C via a network (e.g., a short range network such as a personal area network), where the smart appliance 106C is configured to forward its status, such as the completion of washing as indicated in a display unit 1002 of the smart appliance 106C, to the smart device 104A and/or other smart devices. The smart device 104A, upon receiving a notification message of "washing completed" from the smart appliance 106C, may choose not to noticeably display the notification. In one example implementation, the smart device 104A is configured to ignore the notification so that the user of the smart device 104A won't know any notification from the smart appliance 106C reaching the smart device 104A. In an alternative example implementation, the smart device 104A is configured to display an inconspicuous notification 1004, such as a small icon showing the number of notification in waiting to be viewed appearing on the top right corner of the smart device 104A, upon receiving the notification from the smart appliance 106C.

Figure 11:
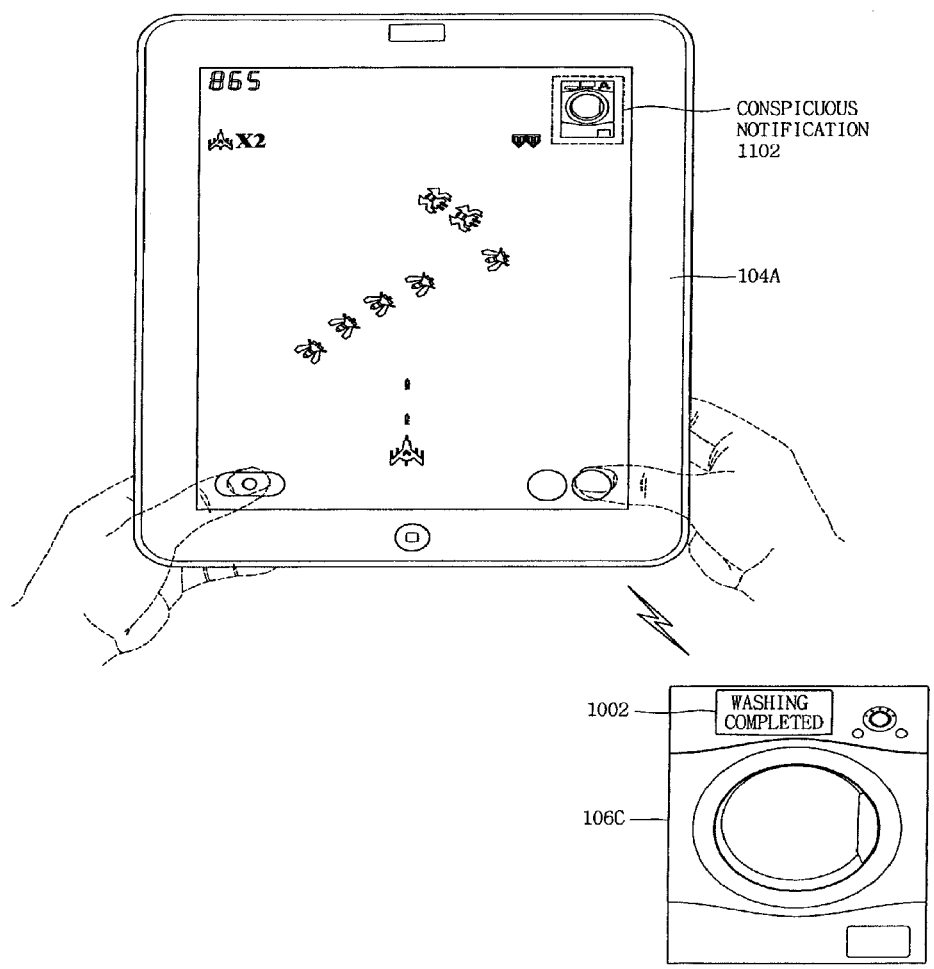
FIG. 11 illustrates another exemplary view of the smart device in FIG. 1 interacting with a smart appliance, according to one embodiment of the present disclosure.

FIG. 11 illustrates another exemplary view of the smart device 104A in FIG. 1 interacting with the smart appliance 106C, according to one embodiment of the present disclosure. In FIG. 11, the smart device 104A is in a relax mode, where the user of the smart device 104A wants to be notified of every extracurricular activity (e.g., via a notification, alert, etc.) experienced by other smart devices or smart appliances connected with the smart device 104A through the network 102. For example, the smart device 104A may be set to be in the relax mode when a primary task such as an online game or online movie is performed. In such an instance, when the smart appliance, such as the smart appliance 106C, forwards a certain notification, the smart device 104A may display the notification in a manner drawing attention of the user of the smart device 104A.

For example, in FIG. 11, the smart device 104A, upon receiving a notification of "washing completed" from the smart appliance 106C, may choose to display the notification in such a way to alert the user of the smart device 104A. As in FIG. 11, the smart device 104A is configured to display a conspicuous notification 1102, such as an icon representing the smart appliance 106C (e.g., the washing machine) and/or text of "washing completed" (not shown) on the top right corner of the smart device 104A, upon receiving the notification from the smart appliance 106C.

The previous description of the disclosed embodiments is provided to enable any person skilled in the art to make or use the present disclosure. Various modifications to these embodiments will be readily apparent to those skilled in the art, and the generic principles defined herein may be applied to other embodiments without departing from the spirit or scope of the disclosure. Thus, the present disclosure is not intended to be limited to the embodiments shown herein but is to be accorded the widest scope consistent with the principles and features disclosed herein.

The invention claimed is:

1. A smart device for interacting with at least one associated smart terminal connected via a network, the smart device comprising:
  a memory;
  a display unit; and
  a processor coupled to the memory and the display unit and the processor configured to:
    identify the at least one associated smart terminal upon activation in the network, the at least one associated smart terminal includes at least one of an associated smart device and an associated smart appliance;
    determine a mode of the smart device based on an application currently executed on a user experience environment of the smart device upon receiving data from one of the at least one associated smart terminal, wherein each application accessed by the smart device is preconfigured with either a mode to process data from any of the at least one associated smart terminal or a mode to block the data from said any of the at least one associated smart terminal; and
    display a message which notifies a receipt of the data from the one of the at least one associated smart terminal on the display unit if the mode of the smart device is determined as the mode to process the data from the one of the at least one associated smart terminal and mask the receipt of the data from the one of the at least one associated smart terminal if the mode of the smart device is determined as the mode to block the data from the one of the at least one associated smart terminal,
    wherein the mode of the smart device is automatically changed based on a temporal basis or a regional basis.

2. The smart device of claim 1, wherein the associated smart device is a personal computer (PC), a tablet PC, a smart TV, a mobile phone, or a laptop computer, and wherein the associated smart appliance comprises a smart home appliance.

3. The smart device of claim 2, wherein the smart home appliance is an air conditioner, a CD player, a washing machine, or a refrigerator.

4. The smart device of claim 1, wherein the network is a short range wireless communication network.

5. The smart device of claim 4, wherein the short range wireless network is a personal area network (PAN).

6. The smart device of claim 1, wherein the mode of the smart device is automatically changed on a temporal basis.

7. The smart device of claim 1, wherein the mode of the smart device is automatically changed on a regional basis.

8. A method of a smart device interacting with associated smart terminals via a network, the method comprising:
  identifying at least one associated smart terminal upon activation of a smart device in a network, wherein the smart device and the at least one associated smart terminal are configured to communicate with each other for notification or for executing at least one command, and the at least one associated smart terminal including at least one of an associated smart device and an associated smart appliance;

determining a mode of the smart device based on an application currently executed on a user experience environment of the smart device upon receiving data from one of the at least one associated smart terminal, wherein each application accessed by the smart device is preconfigured with either a mode to process data from any of the at least one associated smart terminal or a mode to block the data from said any of the at least one associated smart terminal; and displaying a message which notifies a receipt of the data from the one of the at least one associated smart terminal on a display unit of the smart device if the mode of the smart device is determined as the mode to process the data from the one of the at least one associated smart terminal and masking the receipt of the data from the one of the at least one associated smart terminal if the mode of the smart device is determined as the mode to block the data from the one of the at least one associated smart terminal, wherein the mode of the smart device is automatically changed based on a temporal basis or a regional basis.

9. The method of claim 8, wherein the identifying of the at least one associated smart terminal is performed by polling the at least one associated smart terminal upon the activation of the smart device in the network.

10. The method of claim 8, wherein the identifying the at least one associated smart terminal further comprises displaying a representative image of each of the at least one associated smart terminal on the display unit of the smart device.

11. The method of claim 8, wherein each of the smart device and the at least one associated smart terminal is a mobile phone, a personal computer (PC), a mobile computer, a smart TV, or a smart home appliance.

12. The method of claim 8, further comprising forwarding a notification data to the at least one associated terminal.

13. The method of claim 8, further comprising forwarding a command data to the at least one associated terminal.

14. A non-transitory computer readable medium having instructions that, when executed by a computer, cause the computer to perform a method of processing data comprising:

identifying at least one associated smart terminal upon activation of a smart device in a network, wherein the smart device and the at least one associated smart terminal are configured to communicate with each other for notification or for executing at least one command, and the at least one associated smart terminal including at least one of an associated smart device and an associated smart appliance;

determining a mode of the smart device based on an application currently executed on a user experience environment of the smart device upon receiving data from one of the at least one associated smart terminal, wherein each application accessed by the smart device is preconfigured with either a mode to process data from any of the at least one associated smart terminal or a mode to block the data from said any of the at least one associated smart terminal; and displaying a message which notifies a receipt of the data from the one of the at least one associated smart terminal on a display unit of the smart device if the mode of the smart device is determined as the mode to process the data from the one of the at least one associated smart terminal and masking the receipt of the data from the one of the at least one associated smart terminal if the mode of the smart device is determined as the mode to block the data from the one of the at least one associated smart terminal, wherein the mode of the smart device is automatically changed based on a temporal basis or a regional basis.

* * * * *